(No Model.) 3 Sheets—Sheet 1.
W. YOUNG & A. NEILSON.
REFRIGERATING LIQUIDS AND IN THE MEANS EMPLOYED THEREFOR; ALSO, IN APPARATUS FOR THE SUBSEQUENT TREATMENT OF THE REFRIGERATED LIQUIDS.
No. 277,822. Patented May 15, 1883.
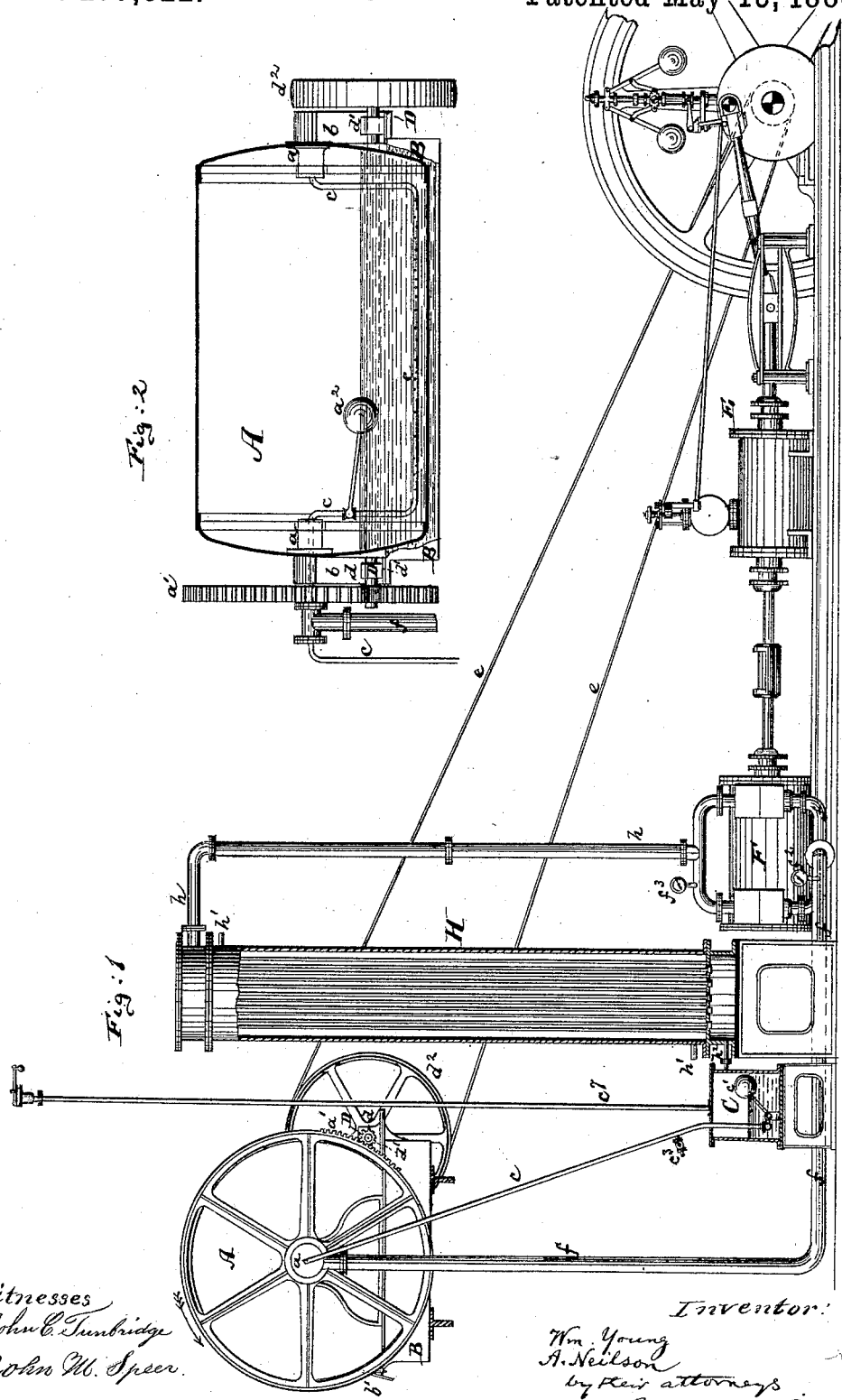
Witnesses
John C. Tunbridge
John M. Speer
Inventor:
Wm. Young
A. Neilson
by their attorneys
Briesen & Betts

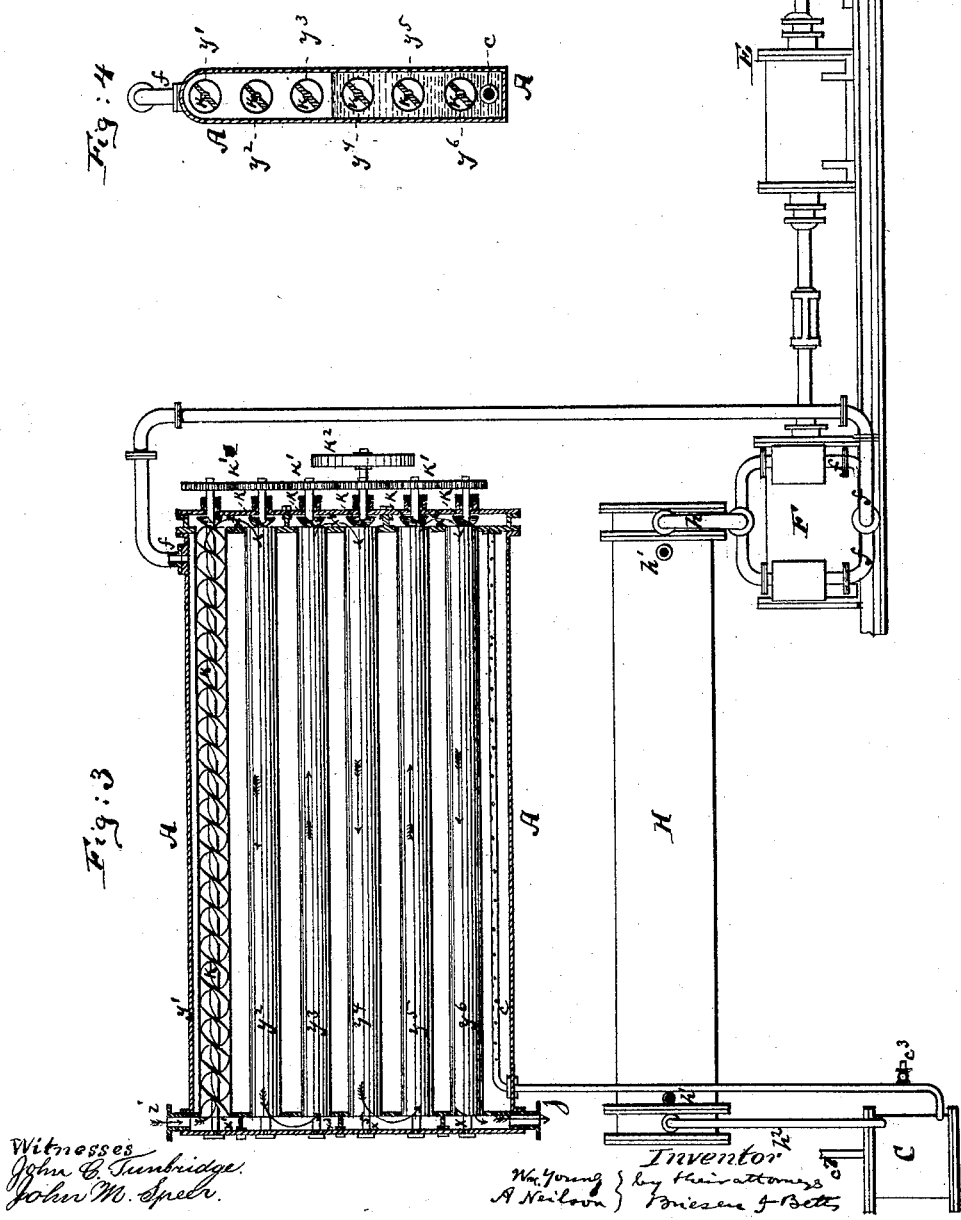

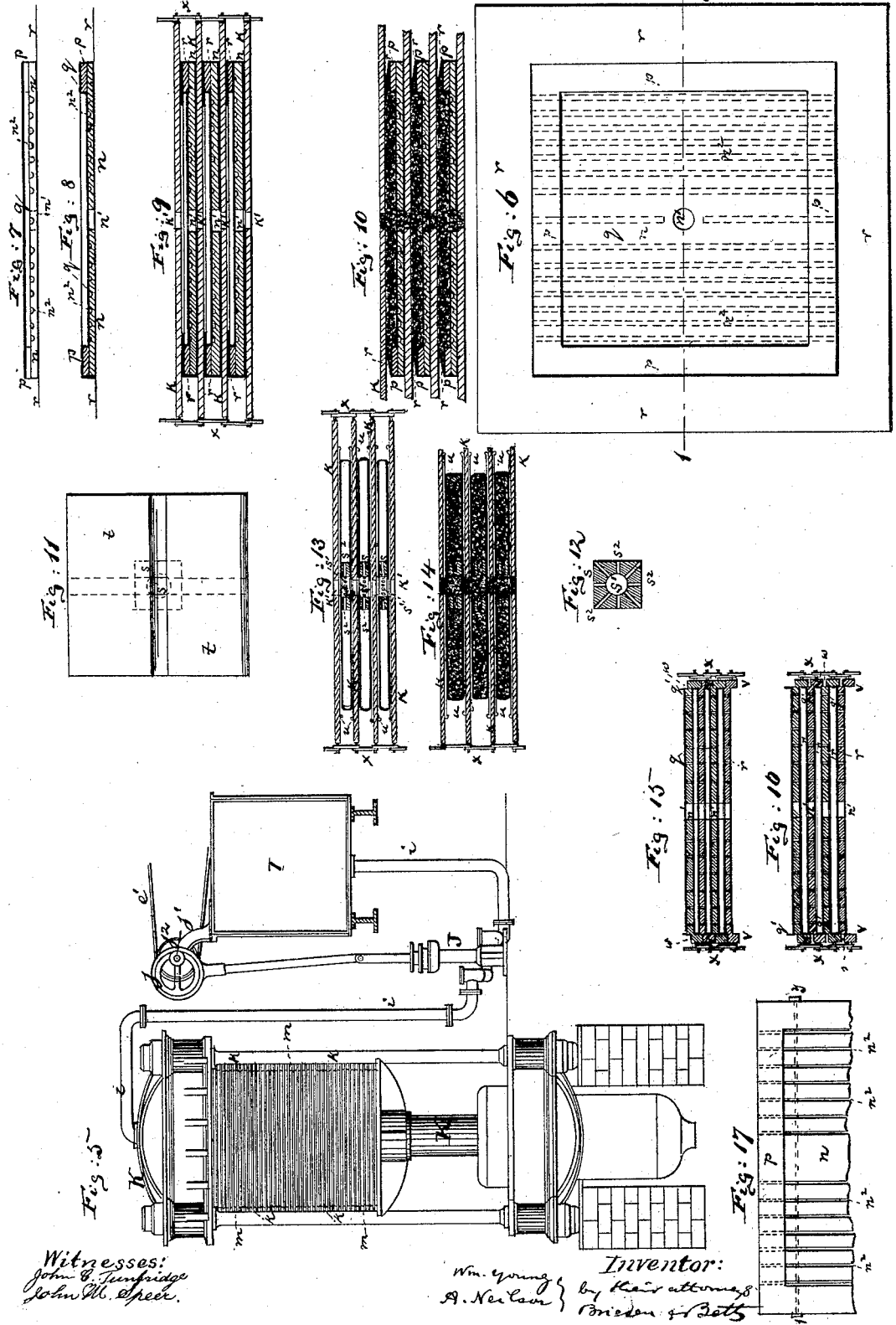

UNITED STATES PATENT OFFICE.

WILLIAM YOUNG AND ALEXANDER NEILSON, OF CLIPPENS, COUNTY OF RENFREW, SCOTLAND, ASSIGNORS TO JOSHUA SIDDELEY AND JOHN SIDDELEY, OF LIVERPOOL, ENGLAND.

REFRIGERATING LIQUIDS AND MEANS EMPLOYED THEREFOR; ALSO APPARATUS FOR THE SUBSEQUENT TREATMENT OF THE REFRIGERATED LIQUIDS.

SPECIFICATION forming part of Letters Patent No. 277,822, dated May 15, 1883.

Application filed November 15, 1882. (No model.) Patented in England December 21, 1877, No. 4,857.

*To all whom it may concern:*

Be it known that we, WILLIAM YOUNG and ALEXANDER NEILSON, both of Clippens, in the county of Renfrew, Scotland, have invented new and useful Improvements in Refrigerating Liquids and in the Means Employed therefor; also in Apparatus for the Subsequent Treatment of the Refrigerated Liquids, (for which we have obtained English Letters Patent for fourteen years, dated December 21, 1877, and numbered 4,857,) of which the following is a specification.

Our said invention relates to improvements in the apparatus and means employed to cool or freeze liquids, more particularly liquids—such as oils—containing substances solid and crystallizable at low temperatures—for example, paraffine, anthracene, stearine, and other analogous substances.

The invention also relates to the means employed for separating the solid from the semi-liquid cooled substances.

Hitherto, in cooling paraffine and other oils containing crystallizable matters, it has been customary to employ a current of brine as the medium between the refrigerating-machine and the drum, cylinder, or equivalent vessel by which the paraffine or other oil is cooled.

One of the main features of this invention consists in making the paraffine or other oil cooling drum or cylinder or its equivalent a part of the refrigerating-machine in the manner hereinafter described, and in dispensing with the use of the current of brine. Thus when the cooling is effected by the evaporation of volatile liquids, as is the case in what is known as the "ether-machine," the ether or other volatile liquid is, under the present invention, placed inside the revolving cooling drum or cylinder, from which the vapors are pumped, and into which the condensed ether is returned by pipes which pass through the trunnions of the drum or cylinder; or when the oil is cooled inside the drum or cylinder or equivalent vessel the ether or other volatile liquid is placed in a surrounding jacket or vessel outside the cylinder or drum or equivalent vessel or vessels in which the cooling is effected. The cooling drum or vessel is thus made to take the place of the refrigerator in the ordinary ether-machine. In a similar manner, when expanding air, vapors, or gases are employed, the expansion is allowed to take place inside, or in a chamber surrounding the cooling drum or vessel.

In Figure 1 of the accompanying drawings is represented an elevation, partly in section, of an apparatus suitable for carrying out this part of our invention, in which the evaporation of a volatile fluid (which we will suppose to be ether) is used as the means for refrigeration. The drum A, which, with its connections, is also shown in longitudinal section in Fig. 2, is supported by trunnions $a$ in bearings $b$, so that, in revolving, the cylindrical surface of the said drum will rotate in a trough or tank, B, in which is placed the oil containing paraffine or other like fluid or semi-fluid to be cooled.

When the machine is in operation the ether which is used is continuously returned into the interior of the drum A from a condenser, H, by a pipe, $c$, passing through one of the trunnions $a$ of the said drum, the said pipe being bent, so as to lie near the bottom of the interior of the said drum A, as seen at Fig. 2. The pipe $c$ is supported at its opposite end in the other of the trunnions $a$, and the said pipe is perforated at the lower part, inside the drum A, and at the end which opens into the vessel C it is provided with a ball-valve, $c'$. The drum is rotated by means of a toothed wheel, $a'$, with which gears a pinion, $d$, upon a shaft, D, carried in bearings $d'$, the said shaft receiving its motion from the engine E through a band, $e$, passed over the pulley $d^2$ upon the shaft D. The engine E drives a pump, F, by which a vacuum is created in the drum A, the air being drawn from the said drum through a pipe, $f$, opening into one of the trunnions $a$ thereof, (which trunnion is for this purpose made hollow.) The air passing into the pump is expelled therefrom through the pipe $h$ into the tubes of the condenser H, from which it issues by the pipe $h^2$ to the vessel C, and finally escapes by the safety-valve on the pipe $c^7$. In charging the drum A with ether, this may be effected, after the vacuum is formed therein by the pump F, by means of a flexible pipe attached to the cock $c^3$, and at the other end to a reservoir containing ether. By the continued action of the pump F the ether passes, by reason of the vacuum created, through the pipe $c$, and out at the perforations thereof, into the drum A, the vacuum therein enabling the ether to be evaporated by absorbing heat from the external liquid contained in the trough B and carried on the external surface of the said drum A, whence it is continuously collected and cooled by the rotation of the drum in the trough B, the said substance, by the continued rotation of the drum A in the direction of the arrow, Fig. 1, being continuously detached in a cooled condition from the drum A by the scraper $b'$, and discharged therefrom into any suitable receptacle. The vapor of ether from the drum A passes (by the action of the pump F) through the pipe $f$ into the pump, from whence it is discharged by the pipe $h$ down through the tubes of the condenser H. This condenser has a current of cold water passed through it in the opposite direction to the flow of the vapor of ether—that is to say, upward and exterior to the condenser-tubes through the pipes $h'$—by which water the vapor of ether is condensed. From the condenser H the ether passes by the pipe $h^2$ into the vessel C as fluid ether. The pipe $c$ dips into the liquid ether in the vessel C, the ball or float valve $c'$ therein and the ball or float cock $a^2$ in the drum A regulating the admission of liquid ether to the drum A, according to the amount of such liquid ether flowing from the condenser into the vessel C—that is to say, when only one vessel or drum A is employed the whole of the condensed ether is returned thereinto, in which case the float or ball cock $a^2$ is unnecessary; but when several such drums or chambers A are used, then the float or ball cock $a^2$ is applied to each such chamber A for the purpose of preventing any one of the chambers becoming overcharged with liquid.

In Fig. 3 is represented in side elevation (partly in longitudinal section) that modification of this part of our invention in which the evaporation of the cooling medium takes place at the exterior of the cooling vessels or tubes, the substance being cooled passing through the interior of the said vessels or tubes. Fig. 4 is a vertical transverse section of a part of Fig. 3. The refrigerator consists of a vessel, A, at either end of which are small chambers $x'$ $x^2$ $x^3$ $x^4$ $x^5$ $x^6$ $x^7$, into which open longitudinal tubular passages $y'$ $y^2$ $y^3$ $y^4$ $y^5$ $y^6$, so as to form a continuous zigzag passage for the liquid to be cooled, extending from the inlet $i$ to its outlet $j$, and whereby the liquid to be cooled takes a backward and forward course through the said channels $x'$ to $x^7$ and the tubular passages $y'$ to $y^6$, as shown by the arrows in Fig. 3. In each of the said tubular passages revolves a helical scraper, $k$, rotated by toothed wheels $k'$ on the ends of their shafts, gearing together and receiving their motion through a pulley, $k^2$, which may be driven in any convenient manner by the engine. The ether is charged into the vessel A until it is rather more than half filled therewith. The paraffine or other matter to be cooled, being drawn or forced through the inlet $i$, passes from the chamber $x'$ through the tube $y'$ into the chamber $x^2$, thence through the tube $y^2$ into the chamber $x^3$, thence through the tube $y^3$, and so on through the chambers $x^4$, $x^5$, $x^6$, and $x^7$, and through the tubes $y^4$, $y^5$, and $y^6$, until it arrives at the outlet $j$, being in its passage cooled by the evaporation of the ether in the vessel A, the said evaporation being effected by a vacuum created in the vessel by the pump F, as hereinbefore described with regard to the apparatus shown at Figs. 1 and 2. The arrangement of the condensing and other vessels and pipes of the refrigerating system being essentially the same and marked with the same letters of reference as similar parts are marked with in Figs. 1 and 2 require no further description. The scrapers $k$ have a helical twist in such a direction and they are so rotated that they effect or assist in effecting the passage of the matter being cooled to the outlet $j$.

In both arrangements of apparatus, Figs. 1 and 3, the inlet and outlet pipes of the pump F may be provided with vacuum-gages, as shown in Fig. 1, where the said gages are marked $f^2$ $f^3$.

The drum A, Figs. 1 and 2, and the chamber A, Figs. 3 and 4, may be employed where the cooling is produced by the expanding of cooled compressed air, vapor, or gas. The drum or chamber A in such case becomes the receptacle for the compressed air, vapor, or gas, and from which the cooling effect is produced in the manner well understood with this mode of refrigerating.

Another part of our said invention relates to means for separating the crystalline solid from the cooled liquid. According to the ordinary practice the mixed, cooled, solid, and liquid substance, commonly called "magma," is placed in canvas bags and subjected to a pressure in what is known as the "drum-press." Attempts to accomplish the same end have been made by pumping the magma into bags placed between the plates of a press, or into recesses of an unalterable or constant and of smaller capacity than the bags themselves, the oil passing through the canvas and the crystalline solid matter remaining within the bags, the pressure to effect the separation being that exerted by the incoming magma upon that previously pumped in. By this method a complete separation of the liquid from the solid portion cannot be effected, because the portion of magma last introduced, having no subsequent pressure exerted upon it, remains in its original state, or nearly so.

The present part of our invention consists of improvements in this mode of separating the solid and liquid portions of the magma by means of receptacles or molds, which allow of magma being pumped into them until they distend beyond their normal capacity, and then allow of direct pressure being exerted upon the magma contained in them when in this expanded condition, so that the liquid is completely expressed therefrom.

In Fig. 5 is represented in side elevation a press suitable for effecting this object. A tank, I, receives the magma—that is, the cooled paraffine, or substance detached from the drum A, Fig. 1, or issuing from the chamber A, Fig. 3. From this tank the magma is pumped by a pump, J, through a pipe, $i$, to the hydraulic press K. The pump J may be worked by an eccentric, $j$, upon a shaft, $j'$, which receives its motion from the engine E, Fig. 1, through the band $e'$, passing over the pulley $j^2$. The magma is pumped into a series of receptacles or molds, $m$, contained between the plates $k$ of the press K, which plates are connected together by links $x$, as shown in Figs. 9 and 13, which are details hereinafter referred to, the said links being for the purpose of preventing the plates of the press from being urged too far apart, as is well understood. The aforesaid receptacles or molds are constructed and the solid and liquid parts of the magma are separated from each other in the manner now to be described.

Fig. 6 is a plan, Fig. 7 a side elevation, and Fig. 8 a vertical section on the line 1 2, Fig. 6, of one modification of the said receptacles or molds $m$. Each receptacle consists of a board, $n$, having channels $n^2$ in its upper side, said channels $n^2$ opening out at the sides of the said board, as seen in Fig. 7. A hole, $n'$, is formed in the center of each board $n$. A margin of wood or other material, $p$, is fixed around the edge of the upper side of the board $n$, and a sheet of canvas or other porous cloth, $q$, is stretched over and attached, by nailing or otherwise, to the upper surface of the board $n$, and over or partly over the margin $p$, as seen clearly in Fig. 8. A sheet of canvas or other porous cloth, $r$, is also stretched over or partly over the under surface of the board $n$, and attached thereto by nailing or otherwise, the said cloth projecting some distance beyond the sides of the board, as seen in Fig. 6. The cloths $q$ and $r$ do not extend across the central opening $n'$, but leave it clear, they being fastened securely round the said hole. In using these receptacles or molds the projecting portions of the cloth $r$ are folded over the margin $p$, so as to overlap to a short distance the space inclosed by the said margin. A series of the said receptacles or molds are placed between the plates $k$ of the press K, and the ram of the press is raised, so that the said plates and molds are brought closely together, the central holes $n'$ in the receptacles or molds being coincident with the central holes $k'$ in the press-plates, and with the opening of the pipe $i$ into the cover of the press K, whereby a continuous passage is formed for the magma from the pipe $i$ through the whole series of plates and receptacles or molds to the bottom of the said series.

In Fig. 9 the position of the receptacles or molds between the press-plates is shown, the said Fig. 9 being a vertical section of three tiers of the series of receptacles or molds. The magma is pumped into the press, passing downward (through the central opening formed as aforesaid) and outward into the molds $m$ until it reaches the margins $p$ thereof. As soon as the pressure of the pump is fully exerted upon the magma the press K is slightly lowered or slackened, which may be effected by a weighted valve. The magma continuing to be pumped into the press, the receptacles or molds become distended, the overlapping edges of the cloth $r$ being pressed against the plates above, as will be seen by reference to Fig. 10, which is a vertical section of three tiers of molds when in this distended condition. By the pressure of the incoming magma the liquid portion, or a great part thereof, filters through the cloth and runs along the channels $n^2$ and out from the press, being received in any suitable receptacle or conducted away by conduits. As soon as the press becomes so filled with magma that the liquid with difficulty filters out, the pumping in of the magma is discontinued and the power of the press applied, whereby the receptacles or molds $m$ and the plates $k$ are forced together into the position Fig. 9, and the magma is pressed into the receptacles or molds, the remaining liquid being expelled therefrom. On taking the receptacles or molds from the press the solid cakes are knocked out of them, and the said molds are again placed in the press for the repetition of the process. These molds or receptacles may be placed in the press one above the other without the intervention of the plates $k$, when the said molds are provided with links, as at $x$, which links are so attached as to be removable to allow of the receptacles or molds being taken from the press, as in the case of press-plates hitherto used. In this case channels $n^2$ may be formed in both the top and bottom of the boards $n$.

A modified form or construction of receptacle is shown in plan in Fig. 11. Each receptacle consists of a piece of wood or other material, $s$, (shown separately in horizontal section in Fig. 12,) having a hole, $s'$, through the center. This piece of wood or other material, $s$, is fastened to the middle of a piece of canvas or other porous cloth, $t$, having a hole in it coinciding with the hole $s'$. This cloth $t$ is considerably larger than the central block, $s$, so that it can be folded over the upper part of the said central block, $s$, (but so as not to cover the hole therein,) whereby a bag-like receptacle is formed, as shown in the said Fig. 11. Each such receptacle is placed between "wickers" or perforated or reticulated plates $u$, which have a hole in their center corresponding to the hole $s'$ in the central piece, $s$, and the receptacles are then placed between the plates of the press, as shown in Fig. 13, which is a vertical section of three tiers of the said receptacles between the press-plates $k$, whose central holes $k'$ are coincident with the holes $s'$ of the said receptacles. The magma being pumped into the press passes downward and outward into the said receptacles through radial holes $s^2$ in the central block, $s$, which holes extend horizontally from the central opening $s'$ to the outer edges or sides of the central block, $s$. The force of the press being relieved, as described with regard to the first form of receptacle, the said magma distends the receptacles, as shown in Fig. 14, which is a vertical section of three tiers of such receptacles. The liquid filters out through the cloth, the wickers, or their equivalents, allowing of its flowing freely away. As soon as this filtration of the liquid takes place with difficulty the pumping of the magma is discontinued and the power of the press applied, whereby the remaining liquid portion is expelled. The receptacles are then removed from the press, and the cloth $t$ being unfolded, the solid matter is removed therefrom. The several cloths $t$ being again folded over the central blocks, $s$, the receptacles are replaced in the press for the repetition of the process.

Figs. 15 and 16 are vertical sections of four tiers of molds or receptacles of a modified construction. The edges of these molds are formed at their under part with longitudinal ribs $v$ and at their upper part with longitudinal grooves or channels $w$, so that when the said molds or receptacles are placed one upon the other the ribs $v$ take into the channels $w$. Links $x$ are used with these molds, as described with respect to the molds Figs. 6 to 10. Cloths $q$ and $r$ are secured over the upper and under sides of these boards, the cloth $q$ extending up the inner sides of the spaces for the magma, which are formed by the placing of the molds or receptacles together, as shown at $q'$. In Fig. 15 the molds or receptacles are represented in the position which they occupy in the press before the magma is pumped into them, and also after the full power of the press has expressed the liquid from the solid matter. Fig. 16 represents the said molds or receptacles in the position which they assume when the press is relieved and they are distended by the incoming magma. Central openings $n'$ are formed for the passage of the magma, as described with regard to the other forms of molds or receptacles.

In place of the channels $n^2$, Figs. 6 to 10, the boards $n$ may be formed of strips, as shown in the plan of a portion of a board, $n$, and its margin $p$ in Fig. 17, the said strips being a short distance apart, so as to leave spaces $n^2$ between the said strips for the passage of the expressed liquid. The strips may be secured together by bolts, as at $y$, the spaces between the strips being preserved by filling-pieces so arranged as not to impede the passage of the liquid. The molds Figs. 15 and 16 are shown as being constructed of such strips.

Having now described and particularly ascertained the nature of our said invention and the manner of putting the same into practical effect, we would observe, in conclusion, that we do not claim as part thereof a rotating drum constructed with an annular space surrounding the same, whereinto the substance to be cooled is placed; but

What we do consider to be novel and original, and therefore claim as our invention, is—

1. The combination of the vessel A, having chambers $x'$ $x^2$, passages $y'$ $y^2$, inlet $i$, outlet $j$, scraper $k$, and apparatus for rotating the same, substantially as specified.

2. The distending receptacles or molds, combined with rigid and perforated face-plates, substantially as described, to allow of the magma being pumped into them until it causes their distention, and then allows of the direct application of the power of a press to complete the expulsion of the liquid portion from the solid portion of the magma, as hereinbefore described.

WM. YOUNG. [L. S.]
    ALEXR. NEILSON. [L. S.]

Witnesses:
  ROBERT ADAM GUNN,
  WM. SMITH,
    Both of 115 St. Vincent Street, Glasgow.